(12) United States Patent
Ross

(10) Patent No.: US 9,795,237 B2
(45) Date of Patent: Oct. 24, 2017

(54) REACHER ASSEMBLY

(71) Applicant: Michael T. Ross, Chesterfield, MI (US)

(72) Inventor: Michael T. Ross, Chesterfield, MI (US)

( * ) Notice: Subject to any disclaimer, the term of this patent is extended or adjusted under 35 U.S.C. 154(b) by 0 days.

(21) Appl. No.: 15/211,356

(22) Filed: Jul. 15, 2016

(65) Prior Publication Data

US 2017/0136619 A1    May 18, 2017

Related U.S. Application Data

(60) Provisional application No. 62/255,858, filed on Nov. 16, 2015.

(51) Int. Cl.
*A47G 25/82*    (2006.01)
*B25J 1/04*    (2006.01)
*A01K 15/00*    (2006.01)

(52) U.S. Cl.
CPC ............ *A47G 25/82* (2013.01); *A01K 15/003* (2013.01); *B25J 1/04* (2013.01)

(58) Field of Classification Search
CPC .......... A47G 25/82; B25J 1/04; A01K 15/003
See application file for complete search history.

(56) References Cited

U.S. PATENT DOCUMENTS

| | | | | |
|---|---|---|---|---|
| 1,343,213 A * | 6/1920 | Johnson | ............... | A01K 15/003 119/804 |
| 3,319,609 A | 5/1967 | Pickard et al. | | |
| 3,591,226 A * | 7/1971 | Elmore, Jr. | ................. | B25J 1/04 223/119 |
| 4,962,957 A * | 10/1990 | Traber | ....................... | B25J 1/04 294/100 |
| 7,287,675 B1 * | 10/2007 | Sullivan | ............... | A47G 25/905 223/111 |
| 8,025,191 B2 * | 9/2011 | Sullivan | ................. | A47G 25/82 223/111 |
| 2004/0255995 A1* | 12/2004 | Garrett | ................... | A45B 7/005 135/66 |
| 2010/0244475 A1* | 9/2010 | Hatcher | ................... | B25G 1/04 294/210 |

* cited by examiner

*Primary Examiner* — Shaun R Hurley
*Assistant Examiner* — Andrew W Sutton
(74) *Attorney, Agent, or Firm* — Dickinson Wright PLLC

(57) ABSTRACT

A reacher assembly (20) combines a single shaft (22) presenting a guideway (30) and supporting a handle (40). A trigger (44) is spaced from the handle (40) and is connected to a closeable jaw (50) by a cable (56) disposed in the channel (38). A snare (66) presents a loop controlled by a slide (72) slidably supported in a slot (74) in the shaft (22) with the snare (66) and the cable (56) extending in parallel and side by side relationship with one another with the snare (66) in the guideway (30) of the shaft (22) and the cable (56) in the channel (38) for movement relative to each other in the shaft (22). A shoehorn (60) is slidably supported by a track (58) on the shaft (22). An incapacitated person may carry only one assembly (20) to perform multiple tasks.

7 Claims, 4 Drawing Sheets

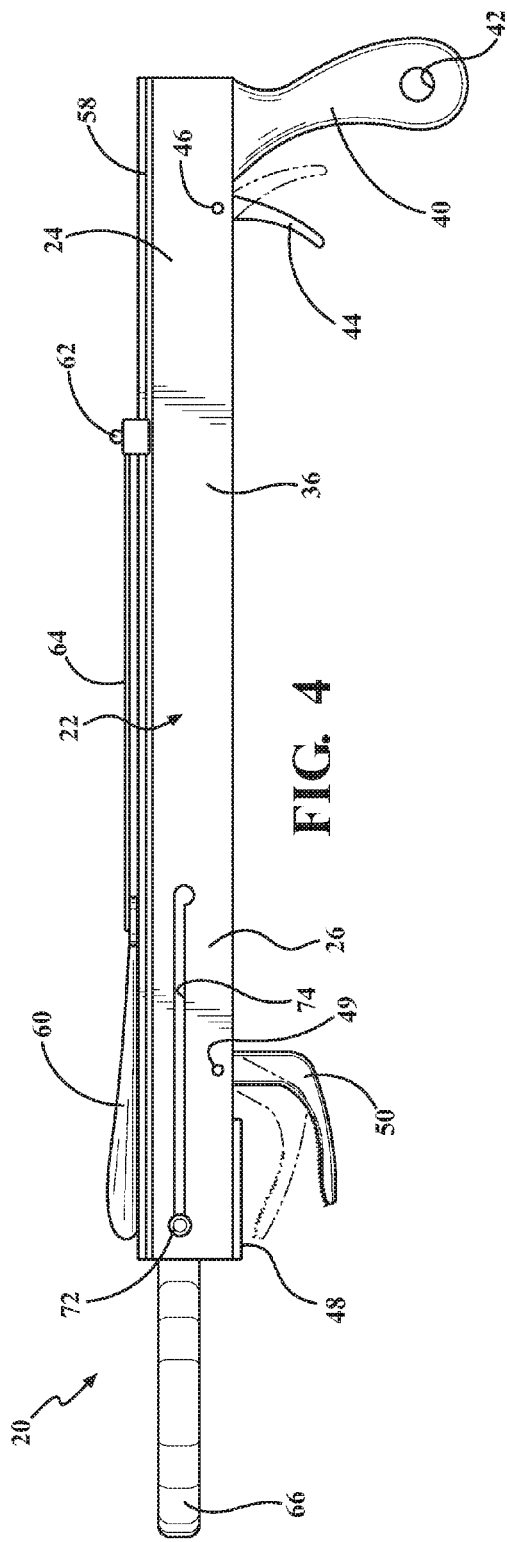
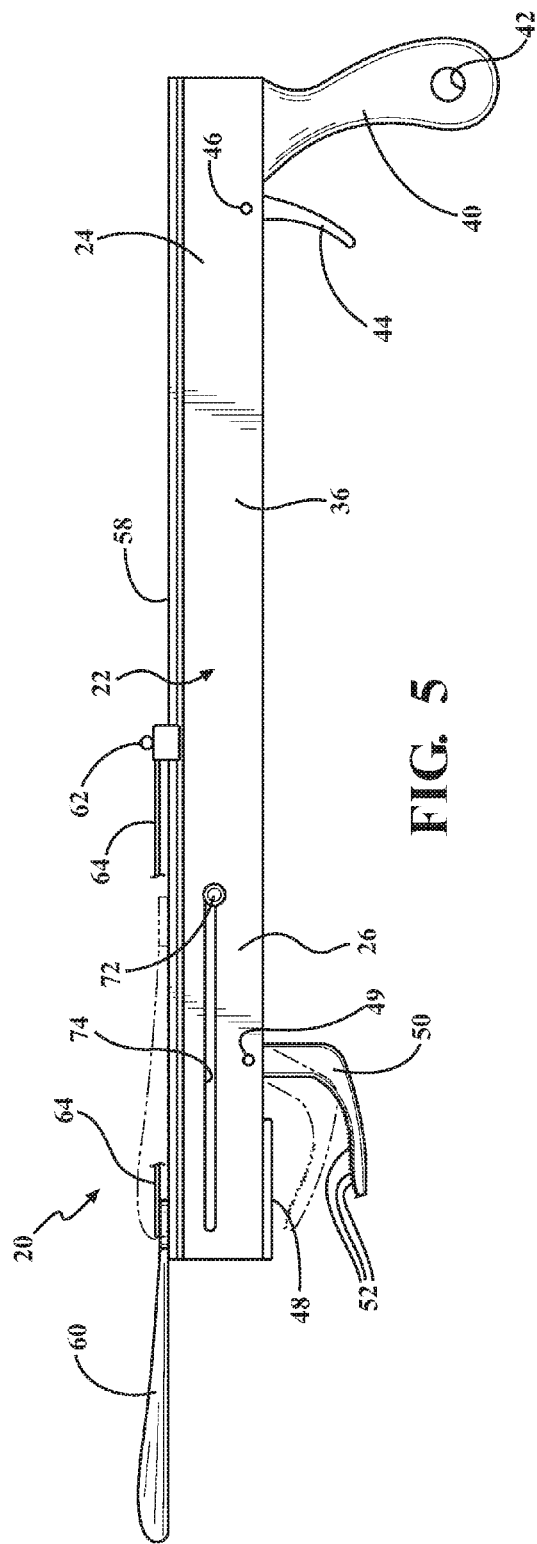

REACHER ASSEMBLY

CROSS REFERENCE TO RELATED APPLICATION

This application claims the benefit of application Ser. No. 62/255,858 filed Nov. 16, 2015.

BACKGROUND OF THE INVENTION

1. Field of the Invention

A reacher assembly to assist an individual with limited mobility at the arms, legs, and back.

2. Description of the Prior Art

Such Reacher assemblies are well known and are generally referred to as health aid assemblies. One such assembly, disclosed in U.S. Pat. No. 8,025,191 granted Sep. 27, 2011 to Michael T. Sullivan and Wayne J. Gullick, discloses an assembly with a shaft extending between a manual length and a retriever length opposing one another and defining a guideway with a rectangular shape. The assembly contains a handle attached to and extending transversally away from the manual length and a trigger pivotally attached to the shaft and being spaced from the handle. A closeable jaw is pivotally attached adjacent to the retriever length for movement away from and towards the retriever length of the shaft for gripping an object. A cable is disposed in the guideway of the shaft and interconnects the closeable jaw and the trigger. The closeable jaw is used to grasp objects. A shoehorn is slidably connected to the top wall of the shaft and is slidable from a retracted position to an extended position.

Another such reacher assembly, in U.S. Pat. No. 3,319,609 granted Oct. 21, 1965 to G. C. Pickard, discloses an assembly with a snare extending in a loop between a fixed end and a movable end with the fixed end connected to the retriever length of the shaft and the movable end of the snare extending into the guideway. This assembly is used to snare and lasso objects by expanding and contracting the closed loop of the snare.

SUMMARY OF THE INVENTION

The invention provides such an assembly including a slide slidably supported by the shaft and connected to the movable end of the snare for expanding and contracting the loop of the snare with the snare extending in the guideway of the shaft in parallel relationship to the cable in the channel of the shaft for controlling the jaw.

ADVANTAGES OF THE INVENTION

The invention in its broadest aspect presents an assembly that is useable by an incapacitated person to perform multiple tasks thereby allowing the person to possess only one assembly to perform multiple tasks.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a side view showing the trigger disengaged with the closeable jaw in an open position, the slide engaged with the snare fully extended, and the shoehorn in the retracted position;

FIG. 5 is a side view showing the trigger engaged with the closeable jaw in a closed position, the slide disengaged and the snare fully extended, and the shoehorn in an extended position.

DESCRIPTION OF THE ENABLING EMBODIMENT

Referring to the Figures, wherein like numerals indicate corresponding parts throughout the several views, a reacher assembly 20, generally shown, assists an incapacitated individual with limited mobility at the arms, legs and/or back.

Figure 1:
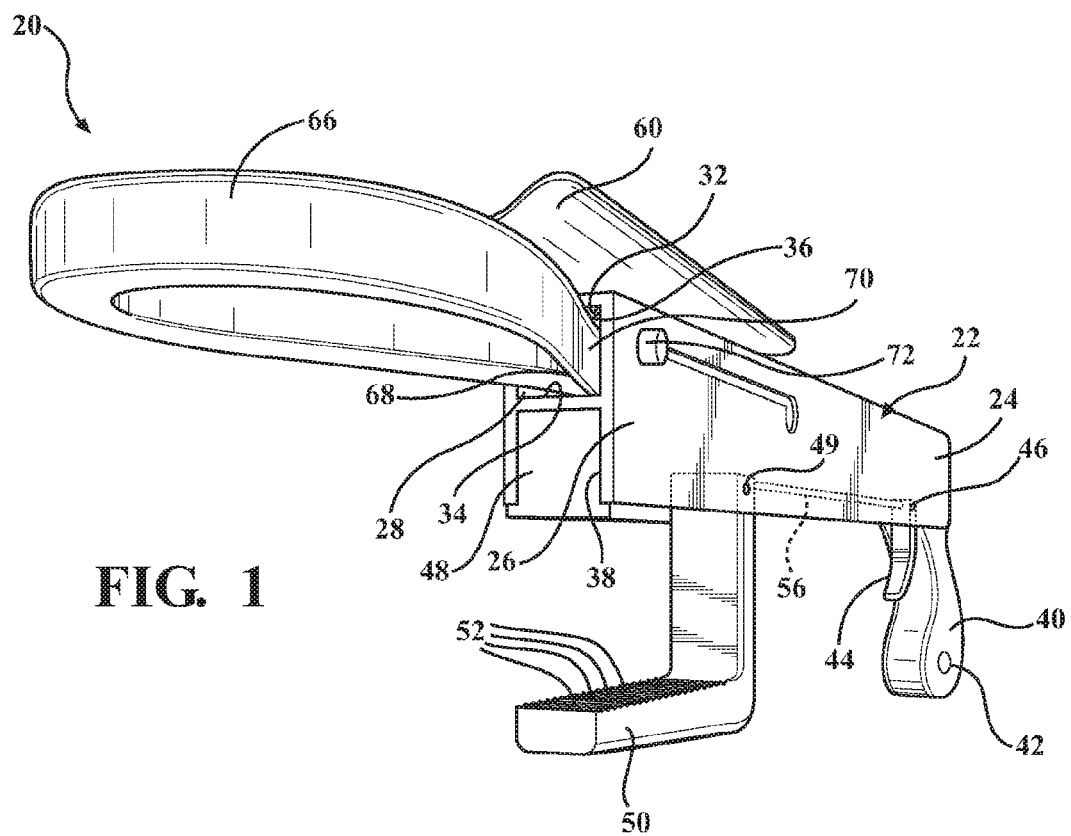
FIG. 1 is a perspective view of the Reacher assembly.
Figure 2:
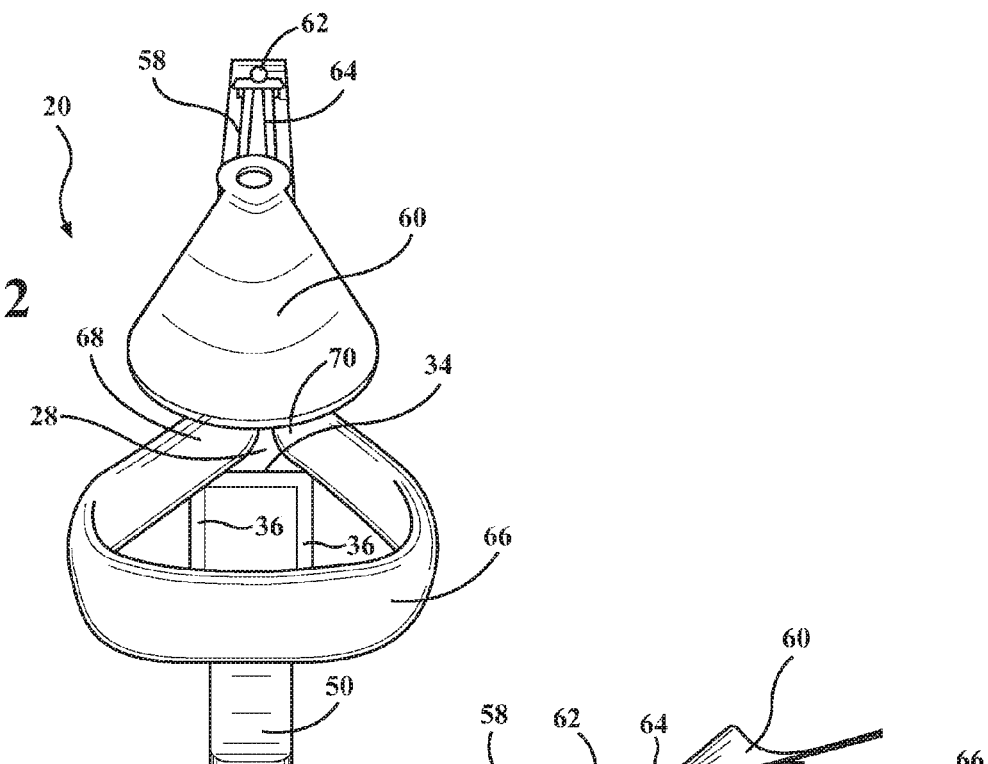
FIG. 2 is a frontal perspective view showing the snare and the shoehorn.
Figure 3:
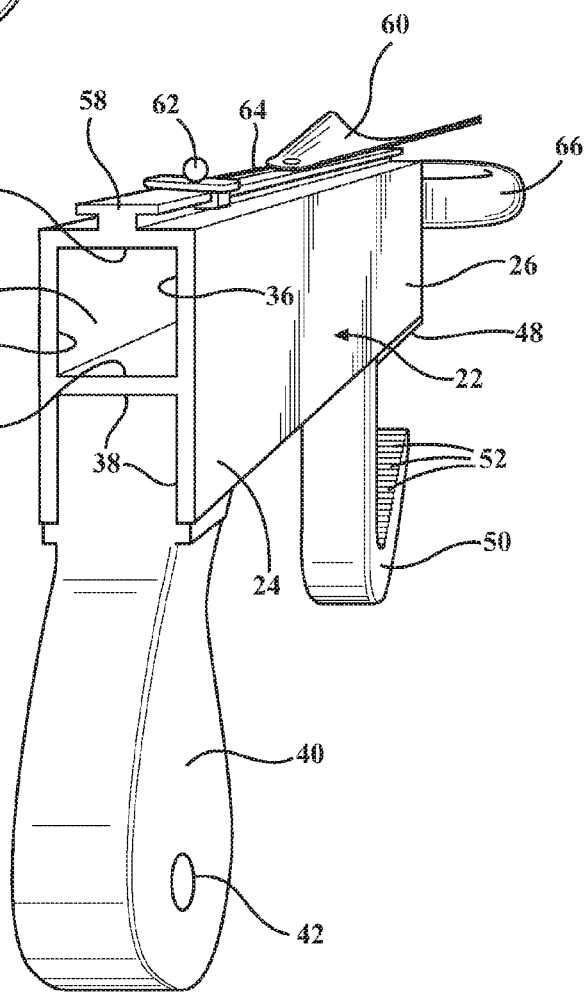
FIG. 3 is a rear perspective view showing the shoehorn track and handle.

The reacher assembly 20 includes a shaft 22, generally indicated, constructed of metal or plastic material, and extending between a manual length or extremity 24 and a retriever length or extremity 26, which lengths 24, 26 extend in opposite directions from one another. As shown in FIGS. 1 and 2, an opening 28 is disposed in the retriever length 26 of the shaft 22 and opens into a guideway 30 having a square-shaped cross section presenting a top wall 32, a bottom wall 34, and two side walls 36. The side walls 36 extend from the bottom wall 34 to define a channel 38 open in a direction opposite to the guideway 30.

A handle 40 is secured, as by gluing, in the channel 38 adjacent the manual length 24 and extends transversally away from the manual length 24 for a person to grip and operate the reacher assembly 20. The handle 40 presents a hole 42 extending through the handle 40 for carry and storage functions, e.g., storage on a hook or looping a cord through the hole 42 for fastening around a person's wrist.

A trigger 44 is pivotally attached 46 between the side walls 36 in the channel 38 and is spaced from the handle 40 at a distance allowing a user to engage the trigger 44 with an index finger while holding the handle 40 with the remainder of the user's hand. A fixed jaw 48 is secured in, as by glue, and fills the channel 38 adjacent the retriever length 26 and extends out of the channel 38.

A closeable jaw 50 is pivotally connected 49 to the shaft 22 adjacent to the retriever length 26 and extends in an L-shape away from the shaft 22 and then towards the retriever length 26 of the shaft 22 for operating between an open position and a closed position. The trigger 44 operates the closeable jaw 50 between an open position, as shown in solid lines in FIGS. 4 and 5, and a and closed position, as shown in phantom in FIG. 4, by pulling the trigger 44 to grasp an object against a plurality of ridges 52 on the closeable jaw 50. The ridges 52 are facing the fixed jaw 48 in the channel 38 of the shaft 22 for grasping an object the closeable jaw 50 and the fixed jaw 48 in the channel 38 of the shaft 22. The closeable jaw 50 is movable between the open and closed positions by a cable 56 (FIG. 1) disposed in the channel 38 of the shaft 22 and interconnecting the closeable jaw 50 and the trigger 44 for pivoting the closeable jaw 50 between the open and closed positions whereby the ridges 52 of the closeable jaw 50 grip an object against the fixed jaw 48 in the channel 38 of the shaft 22.

Figure 6:
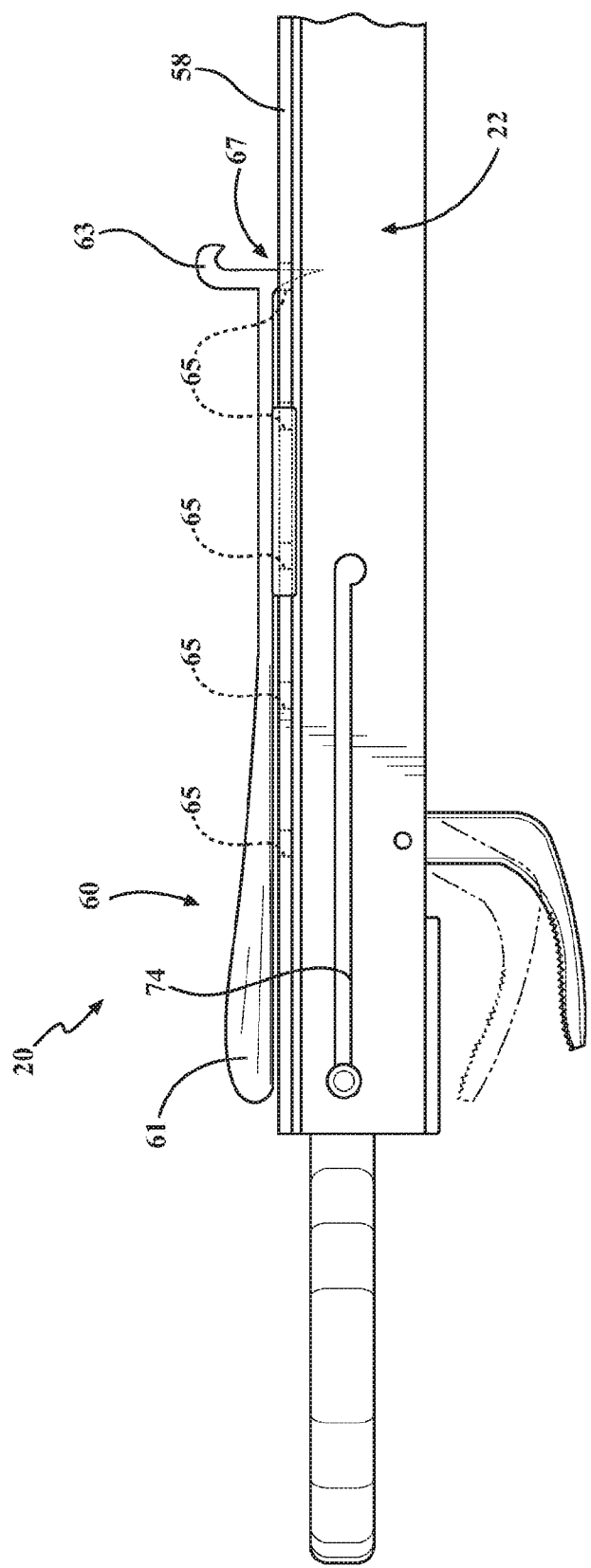
FIG. 6 is a side view showing the shoehorn assembly with the mechanical locking device.

A track 58 is disposed on the top wall 32 of the shaft 22. A shoehorn assembly 60 is slidably supported by the track 58 for rectilinear movement between a retracted position, as shown in phantom in FIGS. 5 and 6, and an engaging position, as shown in solid lines in FIGS. 5 and 6, at the retriever length 26 of the shaft 22. As shown in FIG. 5, a manual actuator 62 is slidably supported on the track 58 and is connected by a rod 64 to the shoehorn assembly 60 for manually moving the shoehorn assembly 60 between the retracted position and the engaging position. As shown in FIG. 6, a mechanical locking device 63 includes a series of female receptacles 65 in the track 58 and a male protrusion 67 for selective insertion into the female receptacles 65 in the track for manually moving the shoehorn assembly 60 to various adjusted positions between the retracted position and the engaging position.

A snare 66, made of a flexible material, e.g., a meshed material such as hemp, leather, cotton, polymer, or wire, extends in a loop with a fixed end 68 connected to the top wall 32 at the retriever length 26 of the shaft 22 and extends in an arch or circle through the opening 28 and into the guideway 30 to a movable end 70. The size of the snare 66, i.e., the loop, is controlled by a slide 72 constructed of a polymer or metallic material. The slide 72 is slidably supported in a slot 74 in the side wall 36 of the shaft 22 and is connected to the movable end 70 of the snare 66 for expanding the loop of the snare 66 in response to movement of the slide 72 by manually pushing the slide 72 towards the manual length 24. The snare 66 and the cable 56 extend in parallel relationship with one another for movement relative to each other in the shaft 22 where the snare 66 is in the guideway 30 of the shaft 22 and the cable 56 is in the channel 38 of the shaft 22.

The reacher assembly allows an individual with limited mobility to do multiple tasks in sequence without using separate tools for separate tasks. For example, an individual may perform multitasks by using the slide 72 of the reacher assembly 20 to contract the snare 66 over the toe of a shoe, pull it towards their foot, and then proceed to slip the shoehorn assembly 60 along the track 58 to an extended position to apply the shoehorn assembly 60 and dress out the shoe onto the individual's foot. Another such use would be to open a kitchen cabinet door by squeezing the trigger 44 of the closeable jaw 50 to grab the door handle and open the door to then move the slide 72 and tighten the loop of the snare 66 about an object, e.g., a can of soup. An additional sequence of uses include the removal of socks from feet by grabbing a foot with the loop of the snare 66 to bring the foot closer and then push the sock off their sock from their foot by inserting the shoehorn assembly 60 into the sock. They could finally, use the closeable jaw 50 to pick the sock up off of the floor. Clearly. The user need only carry a single reacher assembly to perform a multitude of tasks.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
|---|---|
| 20 | assembly |
| 22 | shaft |
| 24 | manual length |
| 26 | retriever length |
| 28 | opening |
| 30 | guideway |
| 32 | top wall |
| 34 | bottom wall |
| 36 | side walls |
| 38 | channel |
| 40 | handle |
| 42 | hole |
| 44 | trigger |
| 46 | pivotally attached |
| 48 | fixed jaw |
| 50 | closeable jaw |
| 52 | ridges |
| 56 | cable |
| 58 | track |
| 60 | shoehorn |
| 61 | foot lever |
| 62 | actuator |
| 63 | mechanical locking device |
| 64 | rod |
| 65 | female receptacles |
| 66 | snare |
| 67 | male protrusion |
| 68 | fixed end |
| 70 | movable end |
| 72 | slide |
| 74 | slot |

What is claimed is:

1. A reacher assembly (20) comprising;

a shaft (22) extending between a manual length (24) and a retriever length (26) opposing one another and defining a guideway (30), said shaft (22) having a square-shaped cross section including a top wall (30) and a bottom wall (34) extending between side walls (36) to define a guideway (30), said side wall (36) extending from said bottom wall (34) to define a channel (38) open in a direction opposite to said guideway (30), a handle (40) secured to and extending transversally away from said manual length (24) for gripping and operating said assembly (20), a trigger (44) pivotally attached (46) to said shaft (22) and being spaced from said handle (40), a fixed jaw (48) secured in said channel (38) adjacent said retriever length (26) and extending out of said channel (38), a closeable jaw (50) pivotally connected (49) adjacent to said retriever length (26) of said shaft (22) for operating between an open position and a closed position, a cable (56) disposed in said channel (38) interconnecting said closeable jaw (50) and said trigger (44) for rotating said closeable jaw (50) between said open position with said closeable jaw (50) spaced from said fixed jaw (48) with said trigger (44) disengaged and said closed position with said closeable jaw (50) next adjacent said fixed jaw (48) with said trigger (44) engaged for allowing said closeable jaw (50) to grasp the object against said fixed jaw (48), a snare (66) extending in a loop between a fixed end (68) and a movable end (70) with said fixed end (68) connected to said retriever length (26) of said shaft (22) and said movable end (70) of said snare (66) extending into said guideway (30), characterized by, a slide (72) slidably supported on said shaft (22) and connected to said movable end (70) of said snare (66) for expanding and contracting the loop with said snare (66) in said guideway (30) and extending in parallel relationship to said cable (56) in said channel (38) for moving relative to each other inside said shaft (22).

2. An assembly (20) as set forth in claim 1 wherein said shaft (22) presents a slot (74) extending longitudinally of said shaft (22), and said slide (72) is slidably supported in said slot (74) in said shaft (22) for expanding said loop of said snare (66) in response to movement of said slide (72) towards said retriever length (26) and for contracting said loop of said snare (66) in response to movement of said slide (72) towards said manual length (24).

3. An assembly (20) as set forth in claim 2 including a track (58) disposed on said shaft (22), and a shoehorn assembly (60) slidably supported by said track (58) for rectilinear movement between a retracted position within said retriever length (26) and an engaging position extending from said retriever length (26) of said shaft (22).

4. An assembly (20) as set forth in claim 3 wherein said shoehorn assembly (60) is slidably supported on said track (58) with a friction fit for rectilinear movement to various adjusted positions between said retracted position and said engaging position.

5. An assembly (20) as set forth in claim 3 including a mechanical locking device (63) interconnecting said shoehorn assembly (60) and said track (58) for rectilinear movement of said shoehorn assembly (60) to various adjusted positions between said retracted position and said engaging position.

6. A shoehorn assembly (60) as set forth in claim 5 wherein said mechanical locking device (63) includes a series of female receptacles (65) in said track (58) and a male protrusion (67) for selective insertion into said female receptacles (65) in said track (58) for rectilinear movement of said shoehorn assembly (60) to various adjusted positions between said retracted position and said engaging position.

7. A reacher assembly (20) for assisting an individual with limited mobility at the arms and legs and back, said assembly (20) comprising;

a shaft (22) extending between a manual length (24) and a retriever length (26) opposing one another, said shaft (22) having a square-shaped cross section including a top wall (32) and a bottom wall (34) extending between side walls (36) to define a guideway (30), said side walls (36) extending from said bottom wall (34) to define a channel (38) open in a direction opposite to said guideway (30), a handle (40) secured in said channel (38) adjacent said manual length (24) and extending transversally away from said manual length (24) for gripping and operating said assembly (20), said handle (40) presenting a hole (42) extending through said handle (40), said shaft (22) having an opening (28) extending into said guideway (30) in said retriever length (26) of said shaft (22), a trigger (44) pivotally attached (46) between said side walls (36) in said channel (38) and spaced from said handle (40) at a distance allowing an adult human engaging said trigger (44) with an index finger while holding said handle (40) with remainder of hand, a snare (66) of a flexible material extending in a loop between a fixed end (68) and a movable end (70) with said fixed end (68) connected to said top wall (32) at said retriever length (26) of said shaft (22) and said movable end (70) of said snare (66) extending in an arch and through said opening (28) into said guideway (30), a fixed jaw (48) secured in said channel (38) adjacent said retriever length (26) and extending out of said channel (38), a closeable jaw (50) pivotally connected (49) adjacent to said retriever length (26) and extending in an L-shape away from said shaft (22) and then towards said retriever length (26) of said shaft (22) for operating between an open position and a closed position, a cable (56) disposed in said channel (38) of said shaft (22) and interconnecting said closeable jaw (50) and said trigger (44) for rotating said closeable jaw (50) between said open position with said closeable jaw (50) disposed spaced from said fixed jaw (48) in said channel (38) of said shaft (22) with said trigger (44) disengaged and said closed position with said closeable jaw (50) next adjacent said fixed jaw (48) in said channel (38) of said shaft (22) with said trigger (44) engaged for allowing said closeable jaw (50) to grasp the object against said fixed jaw (48) in said channel (38) of said shaft (22), said closeable jaw (50) presenting a plurality of ridges (52) facing said fixed jaw (48) in said channel (38) of said shaft (22) for grasping an object between said closeable jaw (50) and said fixed jaw (48) in said channel (38) of said shaft (22), a track (58) disposed on said top wall (32) of said shaft (22), a shoehorn assembly (60) slidably supported by said track (58) for rectilinear movement between a retracted position within said retriever length and an engaging position extruding from said retriever length (26) of said shaft (22), said shoehorn assembly (60) including a manual actuator (62) slidably supported on said track (58) and connected to a rod (64) for manually moving a foot lever (61) between said retracted position and said engaging position, and wherein said shoehorn assembly (60) is slidably supported on said track (58) with a mechanical locking device (63) including a series of female receptacles (65) in said track and a male protrusion (67) for selective insertion into said female receptacles in said track (58) for rectilinear movement of said shoehorn assembly (60) to adjusted positions between said retracted position and said engaging position, and characterized by, said side wall (36) of said shaft (22) presenting a slot (74) extending longitudinally of said shaft (22), a slide (72) slidably supported in said slot (74) in said shaft (22) and connected to said movable end (70) of said snare (66) for expanding said loop of said snare (66) in response to movement of said slide (72) towards said retriever length (26) and for contracting said loop of said snare (66) in response to movement of said slide (72) towards said manual length (24), said snare (66) and said cable (56) extending in parallel relationship with one another with the snare (66) in the guideway (30) of the shaft (22) and the cable (56) in the channel (38) of the shaft (22) for movement relative to each other in the shaft (22).

\* \* \* \* \*